(12) United States Patent
Schmidt

(10) Patent No.: US 7,984,828 B2
(45) Date of Patent: Jul. 26, 2011

(54) DEVICE TO ALLOW FOR CLEANING ACCESS IN SEMI-SOLID METERING MACHINES

(76) Inventor: Norman G. Schmidt, Burnaby (CA)

( * ) Notice: Subject to any disclaimer, the term of this patent is extended or adjusted under 35 U.S.C. 154(b) by 584 days.

(21) Appl. No.: 11/907,831

(22) Filed: Oct. 17, 2007

(65) Prior Publication Data

US 2008/0105705 A1     May 8, 2008

Related U.S. Application Data

(60) Provisional application No. 60/852,423, filed on Oct. 18, 2006.

(51) Int. Cl.
*B67D 5/16* (2006.01)
(52) U.S. Cl. ............ 222/148; 222/272; 134/33; 134/59
(58) Field of Classification Search ............... 222/71, 222/148, 1, 367, 368, 410, 393–395, 272; 134/33, 59; 426/504
See application file for complete search history.

(56) References Cited

U.S. PATENT DOCUMENTS

| | | | | |
|---|---|---|---|---|
| 216,617 A * | 6/1879 | Jaquette | | 222/281 |
| 2,246,106 A * | 6/1941 | Patt | | 384/217 |
| 3,326,144 A * | 6/1967 | Palmer | | 222/281 |
| 4,951,494 A * | 8/1990 | D'Alterio | | 72/199 |
| 5,201,441 A * | 4/1993 | Hoppe et al. | | 222/368 |
| 5,811,145 A * | 9/1998 | Morikawa | | 426/503 |
| 5,824,349 A * | 10/1998 | Muller | | 425/145 |
| 5,919,495 A * | 7/1999 | Fletcher et al. | | 425/238 |
| 6,050,456 A * | 4/2000 | Soper et al. | | 222/272 |
| 6,344,227 B1 * | 2/2002 | Schmidt | | 426/503 |
| 7,182,588 B2 * | 2/2007 | Lambauer et al. | | 425/101 |
| 2005/0257692 A1 * | 11/2005 | Marcato | | 99/353 |

\* cited by examiner

*Primary Examiner* — Kevin P Shaver
*Assistant Examiner* — Donnell Long
(74) *Attorney, Agent, or Firm* — Tangent Law Group, PLLC; Eric J. Weierstall, Esq.

(57) ABSTRACT

The invention is directed to semi-solid food product metering devices that typically have two counter rotating feed rollers with ends to entrain the semi-solid food product and has an at least one actuating device. The two feed rollers have two roller end plates at each end of the feed rollers, one being at a distal end of the rollers and the other at a proximal end of the rollers relative to the at least one actuating device with an at least one support bar. The feed rollers make a positive seal with the end plates. The semi-solid food product metering device of the invention has an open position and an operating position where the at least one support bar supports the two roller end plates in position while in the operating position and operating the semi-solid food product metering device, and allowing for lateral movement of the end plates away from the ends of the feed rollers to allow access to the gap between the feed roller ends and the roller end plates in the open position.

4 Claims, 5 Drawing Sheets

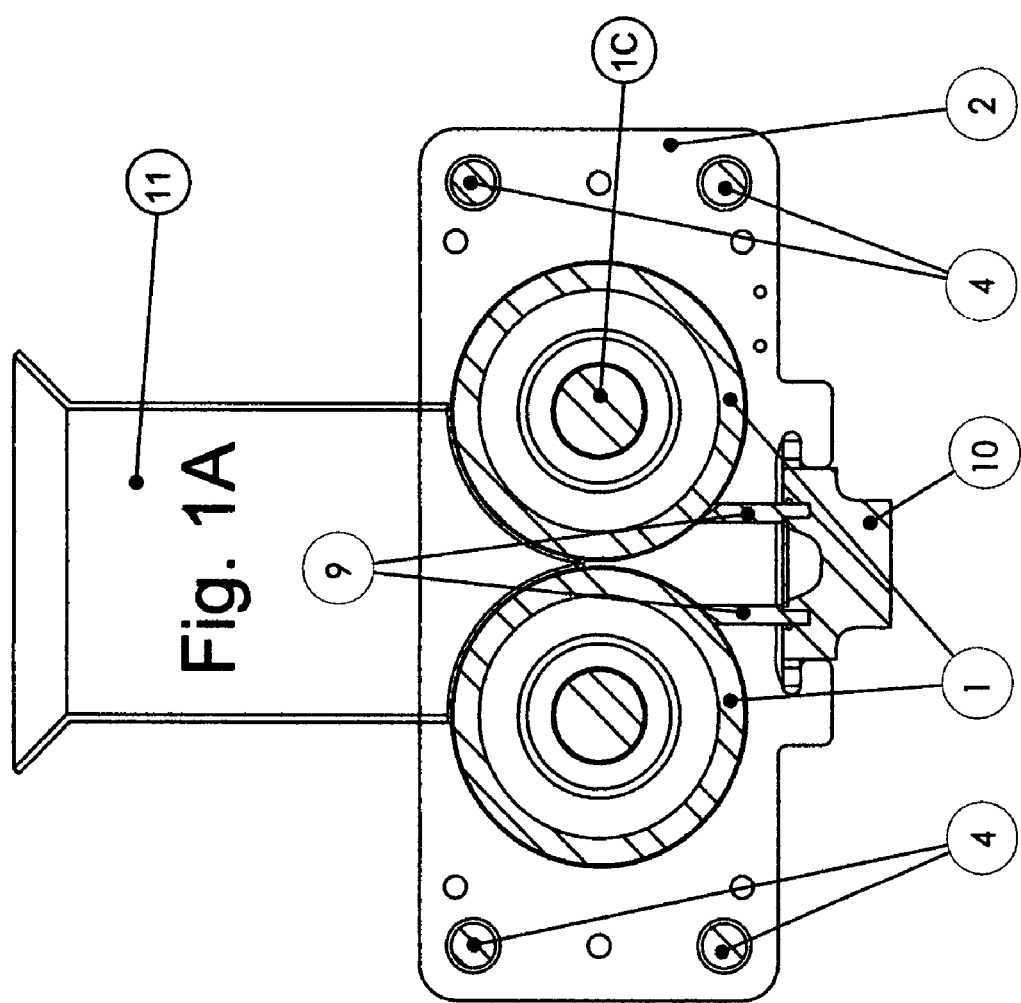

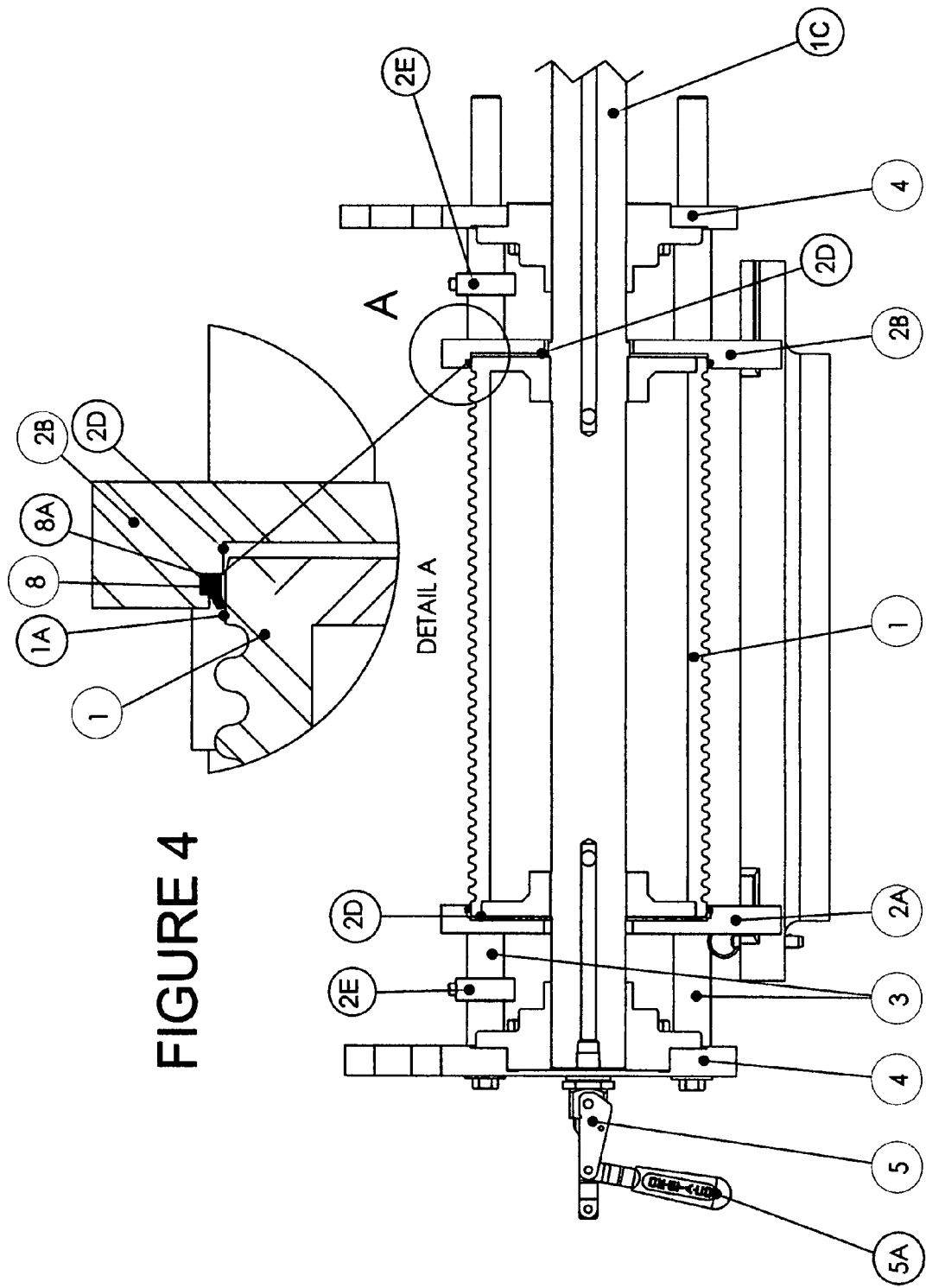

DEVICE TO ALLOW FOR CLEANING ACCESS IN SEMI-SOLID METERING MACHINES

CROSS-REFERENCE TO RELATED APPLICATIONS

This application claims the priority of U.S. provisional patent application 60/852,423, filed Oct. 18, 2006, which is incorporated herein by reference.

BACKGROUND OF INVENTION

In the production of food products such as cookies, candies, icing of cakes, dough for and other food and non food products that may be a semi-solid material there is always a need to pump or move the bulk material and meter it. The instant invention is directed to machines typically used in the production of cookies, hard candies, confectionary products and other food and non food products using at least two counter rotating rollers with end plates, such as but not limited to parallel end plates that are placed at close proximity to the ends of the counter rotating roller pair. The counter rotation of the rollers grip and cause semi-solid mediums placed on the top of the rollers to become entrained and pass through the pinch point of the rolls, as described in the inventor's co-pending application entitled device for controlled metering of semi-solid food products, incorporated herein by reference. The drive or gripped passage of the semi-solid medium puts pressure on the semi-solid medium and pushes the medium toward the pinch point of the feed rollers. This pressure is then used to move the semi-solid medium through the die block located beyond the feed rollers. The die block being the device that shapes the semi-solid medium into the desired extruded form.

The close proximity of the ends of the feed rollers to the roller end plates is meant to constrain the semi-solid medium causing it to pass through the pinch point of the feed rollers, eliminating the semi-solid medium from passing between the feed roller ends and the mating roller end plates.

Prior art machines provide a clearance spacing between these components, this is necessary to ensure the proper operation of the feed rollers. However this clearance space, although small, allows some semi-solid material to seep between the feed roller ends and the end plates, contaminating the machine, with no easy option when it comes time to clean the machine other than full disassembly. Even with tight clearances a certain amount of semi-solid medium will still enter into the clearance space between the feed roller ends and the roller end plates.

With prior art machines this clearance has presented a location for residual semi-solid materials to collect. This collected semi-solid material has always posed a problem in that the clearance spacing between the feed roller ends and the end plates is difficult to access. This clearance spacing is near impossible to clean efficiently because with prior art machines the end plates are fixed with reference to the feed roller ends and the clearances are small and tight, making access for efficient cleaning very difficult even with liquid sprayers. Being difficult to clean, this area has always been a sanitation issue as well as an area where allergens, such as but not limited to peanuts or other pieces of additives, become lodged and at a later time may exit into a product that is normally considered to be free of the material. This is especially problematic if the material is an allergen like peanuts. Thus the instant invention provides a mechanical device by which the clearance space or gap between the feed roller ends and the mating end plates may be cleaned or access to this area may be easily, obtained allowing for proper and efficient cleaning of residual process materials.

Thus the instant invention provides a mechanical solution by which a sealing system is incorporated between the roller end and the mating end plate plus a way of opening this area to allow for proper and efficient cleaning of residual process materials.

SUMMARY OF INVENTION

The invention allows for the implementation of replaceable seals between the feed roll ends and the roller and plates as well as a mechanism to open the area between the feed roll ends and the roller end plates on machines that are used in the production of, for instance but not limited to, cookies and confectionary items, such as but certainly not limited to, chocolate coated candy centers, cookies, cookies with inclusions, hot cross buns, brownie batter, icing, dough, confections, and dough with inclusions. The exemplary embodiment of the invention as shown has a manually operated, mechanical solution that opens the gap between the feed roller ends and roller end plates allowing quick access to area between feed roller ends and mating roller end plates without necessitating the need to disassemble the machine. Similarly, the system may be employed in non-food equipment. The purpose of providing an opening between the feed roller ends and the end plates in the case of confectionary machines is to gain access to this recess to allow proper cleaning of the device allowing the removal of possible allergens. Prior art machines do not possess this ability, as their feed rollers are fixed directly to the end plates.

An object of the invention is to provide improved access to clean and maintain semi-solid food product metering devices.

A further object is to provide a quick actuating device to aid in opening a semi-solid food product metering devices in an open position to provide improved access to a pair of rollers and allow for cleaning and sanitizing.

The method of the invention includes a method for operating a semi-solid food product metering device comprising the steps of operating the semi-solid food product metering device in an operating position to meter semi-solid food product, the semi-solid food product metering device having an actuating device, a pair of rollers having a distal and a proximal end, two roller end plates at the distal end and the proximal end of the feed rollers and making a positive seal therewith, an at least one support bar having the end plates supported thereon and a central rod communicating with at least one of the two roller end plates and the actuating device, halting the semi-solid food product metering device from operating, activating the actuating device to move the semi-solid food product metering device into an open position, wherein in moving to the open position the actuating device moves the central rod which in turn moves the at least one end plate laterally along the at least one support bar to the open position, and disengaging the positive seal with the end plate and opening a gap, and cleaning the semi-solid food product metering device, the two rollers and the gap, in the open position and activating the actuating device to return the semi-solid food product metering device to an operating position.

The activating step can further include activating an actuating arm as part of the actuating device, the actuating arm being coupled to an actuating plunger, the actuating plunger passing through a movement sleeve, the movement sleeve passing through an at least one support plate via a bore hole such that the actuation of the actuator arm moves the actuation plunger which in turn passes through the movement sleeve and then moves the central rod which in turn moves the device from the operating position to the open position.

The activating of the actuating device step, in moving from the operating position to the open position, can also include having the actuator arm move and in turn moving the actuation plunger, the central rod, and in turn the distal roller end plate, such that the distal roller end plate continues to move away from the feed rollers until it comes in contact with an end plate stop and once the distal roller end plate contacts the end plate stop continued movement of the actuator arm puts pressure on the movement sleeve, which is fixed to the distal roller plate, that in turn causes the proximal end plate to move away from the proximal end of the feed rollers until it comes in contact with an additional end plate stop.

The method step of operating further provides the positive seal with a sealing element at each of the ends of the two counter rotating feed rollers, the positive sealing elements being engaged in the operating position and wherein in the method step of activating, the disengaging of the positive seal with the endplate further comprises disengaging the positive sealing elements in the open position.

The apparatus of the invention includes a semi-solid food product metering device having two counter rotating feed rollers with ends, an at least one actuating mechanism or device, two roller end plates at each end of the rollers, one being at a distal end of the rollers and the other at a proximal end of the rollers relative to the at least one actuating device, and an at least one support bar. The semi-solid food product metering device has an open position and an operating position where the at least one support bar is coupled to and supports the two roller end plates in position while in the operating position and operating the semi-solid food product metering device, while allowing for lateral movement of the end plates away from the ends of the feed rollers to allow access to the gap between the feed roller ends and the roller end plates in the open position.

The semi-solid food product metering device can also include a central rod in communication with the end plates, wherein the actuating device moves the central rod which in turns moves the end plates along the support bar to provide access to a gap spacing when the device is in the open position. The actuating device can further have an at least one actuating arm coupled to the central rod, the movement of the at least one actuating arm moving the central rod and the device from an open position to an operating position and vice versa.

The movement of the actuating device in moving the end plates moves the end plates from an initial operating position into an open position wherein the end plates are in communication with an at least one stopping mechanism. The semi-solid food product metering device can further include providing a positive sealing element at each of the ends of the two counter rotating feed rollers, the positive sealing elements being engaged in the operating position and disengaged in the open position.

The positive sealing element can be, but is not limited to, a counter bore in each of the two end plates for receiving the ends of the two counter rotating feed rollers to provide a positive seal and the positive sealing element can be engaged in the operating position preventing leakage of the semi-solid material from said distal end of the rollers and proximal end of the rollers in the device. The positive sealing element can also include or be feed rollers fitted with end seal members that fit into mating seal sections or rings contained in mating roller end plates when the device is in the operating position.

The at least one actuating device can also have an actuating arm and an actuating plunger, the actuating arm being coupled to the actuating plunger, the actuating plunger passing through a movement sleeve, the movement sleeve passing through an at least one support plate via a bore hole such that the actuation of the actuator arm moves the actuation plunger which in turn passes through the movement sleeve and moves the central rod which in turn moves the device from the operating position to the open position.

The movement sleeve can be fixed to at least one of the two roller end plates. The movement sleeve can be fixed to the proximal roller plate and, in moving from the operating position to the open position, the actuator arm is moved and in turn moves the actuation plunger, the actuation rod, and in turn the distal roller end plate, which continues to move away from the feed rollers until it comes in contact with an end plate stop and once the distal roller end plate contacts the end plate stop continued movement of the actuator arm puts pressure on the movement sleeve which in turn causes the proximal end plate to move away from the proximal end of the feed rollers until it comes in contact with an additional end plate stop.

The semi-solid food product metering device, when in the operating position, has the operational pressure of the semi-solid materials moving through and against the rollers and the roller end plates causes the hold of the at least one actuator device to become tighter in a locked, closed position with a force that is proportional to the pressure forces placed or exerted on the roller end plates during operation.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

DETAILED DESCRIPTION OF THE FIGURES

FIG. 1A shows a cut away front view of the exemplary device of FIG. 1.

FIG. 4 shows a cross sectional view along the main roller shaft center line showing roller end, roller end plate counter bores and seals in the closed position.

DETAILED DESCRIPTION

The instant invention allows the roller end plates 2A, 2B of the machine to move away from each other and at the same time away from the ends of the feed rollers 1. As discussed previously this is important as both feed rollers as well as the roller end plates in existing and prior art designs are fixed in a position where only a small amount of clearance exists between the ends of the feed rollers and the end plates, creating a cleaning and hygienic issue. The existing designs small amount of clearance being a compromise between competing requirements, too large a clearance spacing would allow for significant passage of semi-solid product between the feed roller end and the roller end plate while too tight a clearance could cause the device to seize or lock up due to a very small amount of semi-solid product going in to the clearance spacing and with the operating, rotational rubbing friction between the feed roller ends and the roller end plates causing the captured semi-solid product to heat and bond the end of the feed roller to the feed roller end plate. The existing, fixed clearance spacing of these designs would typically be in the area of 0.010 inches. It is considered normal that semi-solid materials would accumulate in this gap area with only a portion of these semi-solid materials being removable through normal exterior washing and for complete removal of materials requiring overly complicated sanitation with significant disassembly of the device and interruption in production. The instant invention solves these longstanding problems, satisfying the long felt need for improved access to these rollers for safety, productivity, and sanitary reasons. The instant invention also provides the unexpected benefit of increasing efficiency by reducing down time needed to clean between materials.

Figure 1:
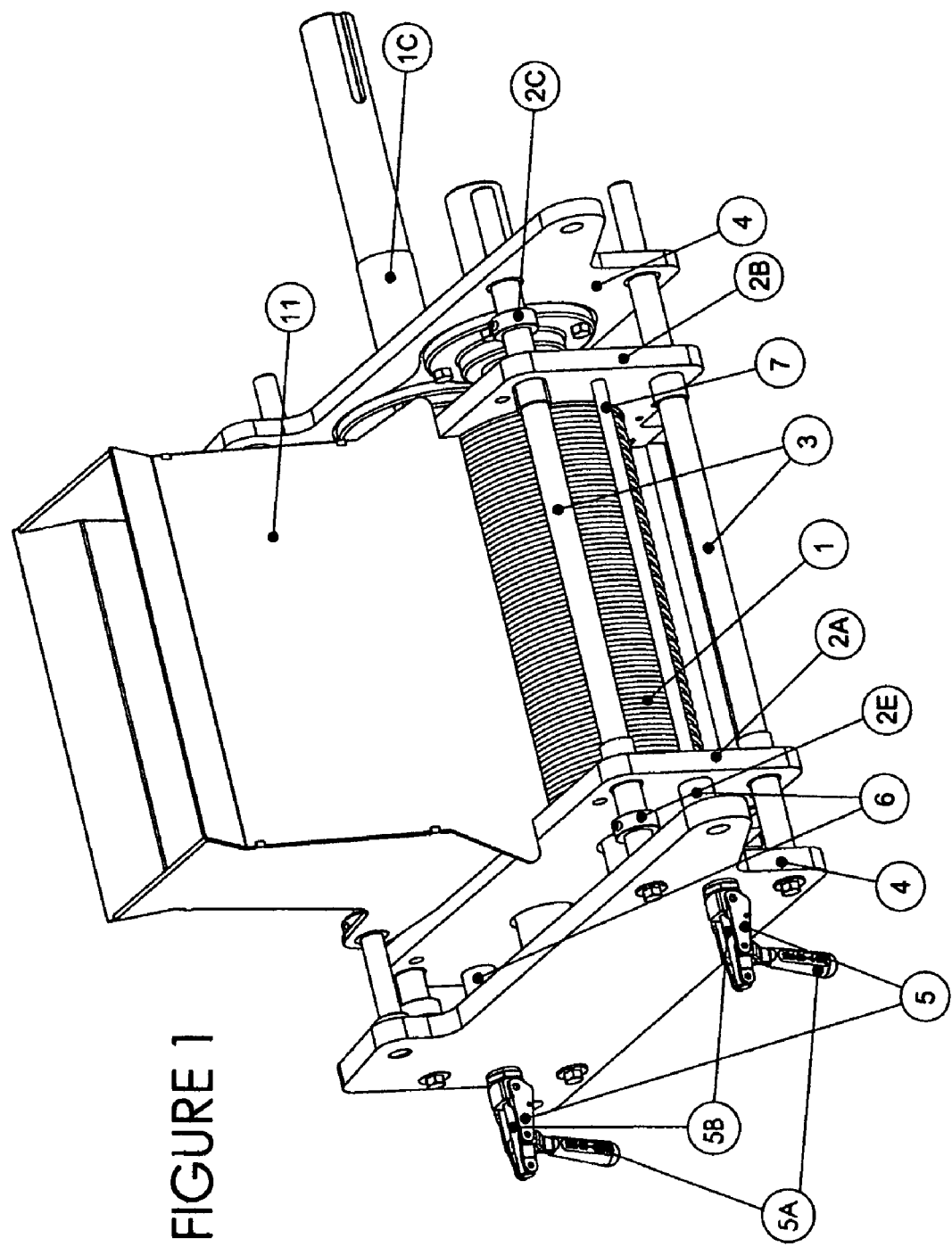
FIG. 1 shows an isometric view of an exemplary device of the instant invention for forming semi-solid materials with the hopper in place.

FIG. 1 shows an isometric view of an exemplary device of the instant invention for forming semi-solid materials and FIG. 1A shows a cut away end view of FIG. 1. The figure shows the device with a hopper 11 for containing and transmitting a semi-solid food material to the device. The exemplary embodiments provides a pair of counter rotating feed rollers 1 with extension sections feed roller ends 1A located on both the feed roller ends 1A, which may be better viewed in FIG. 4, that are located at the extremities of the feed rollers 1. The feed roller ends 1A extend into mating counter bores 2C contained in the roller end plates 2A, 2B as best seen in FIG. 4. As the feed roller ends 1A fit into the counter bores 2C of the roller end plates 2A and 2B they engage with feed roller seal areas or seals or seal members 8 as shown in FIG. 4 that are constructed so as to produce a positive seal between the feed roller end 1A and the roller end plate 2A, 2B.

One example of a feed roller with seal is shown in the exemplary embodiment of FIG. 4, showing a positive seal at the end of the feed roller ends 1A where the seal 8 is held in a seal groove 8A contained in both of the counter bores 2C of the roller end plate 2A and 2B. Another non-limiting example of an alternative manner of sealing is to provide feed rollers 1 that are fitted with end seals (not shown) that fit into or against mating seal sections or rings (not shown) contained in the mating roller end plates 2A, 2B. Various additional methods and structures may be incorporated to provide a positive seal at the end of the feed rollers 1 that is easily disengagable. These feed rollers 1 with seals 8 at the roller ends 1A of the rollers provides increased sealing of semi-solid process materials preventing leakage or bypass of semi-solid process materials into the area between the feed roller ends 1A and the roller end plates 2A, 2B.

The roller end plates 2A, 2B are supported by support bars 3 which provide rigidity sufficient to hold the roller end plates 2A,2B in position but allow for lateral movement of the end plates 2A,2B away from the ends of the feed roller ends 1A. This movement allows for an access roller gap 2D between the feed roller ends 1A and the roller end plates 2A, 2B. When the roller end plates 2A, 2B are moved away from the feed roller ends 1A of the feed rollers 1 the roller gap 2D is increased from an operating clearance of a few thousandths of an inch to between one and two inches once fully opened. An actuating device 5, as shown and explained in relation to the other figures herein below, moves the device from a closed to an opened position. This access then allows for sanitation personnel to easily insert and use water hoses, pressure washers or similar sanitation devices to spray into these areas to remove residual materials and/or allergens.

Figure 2:
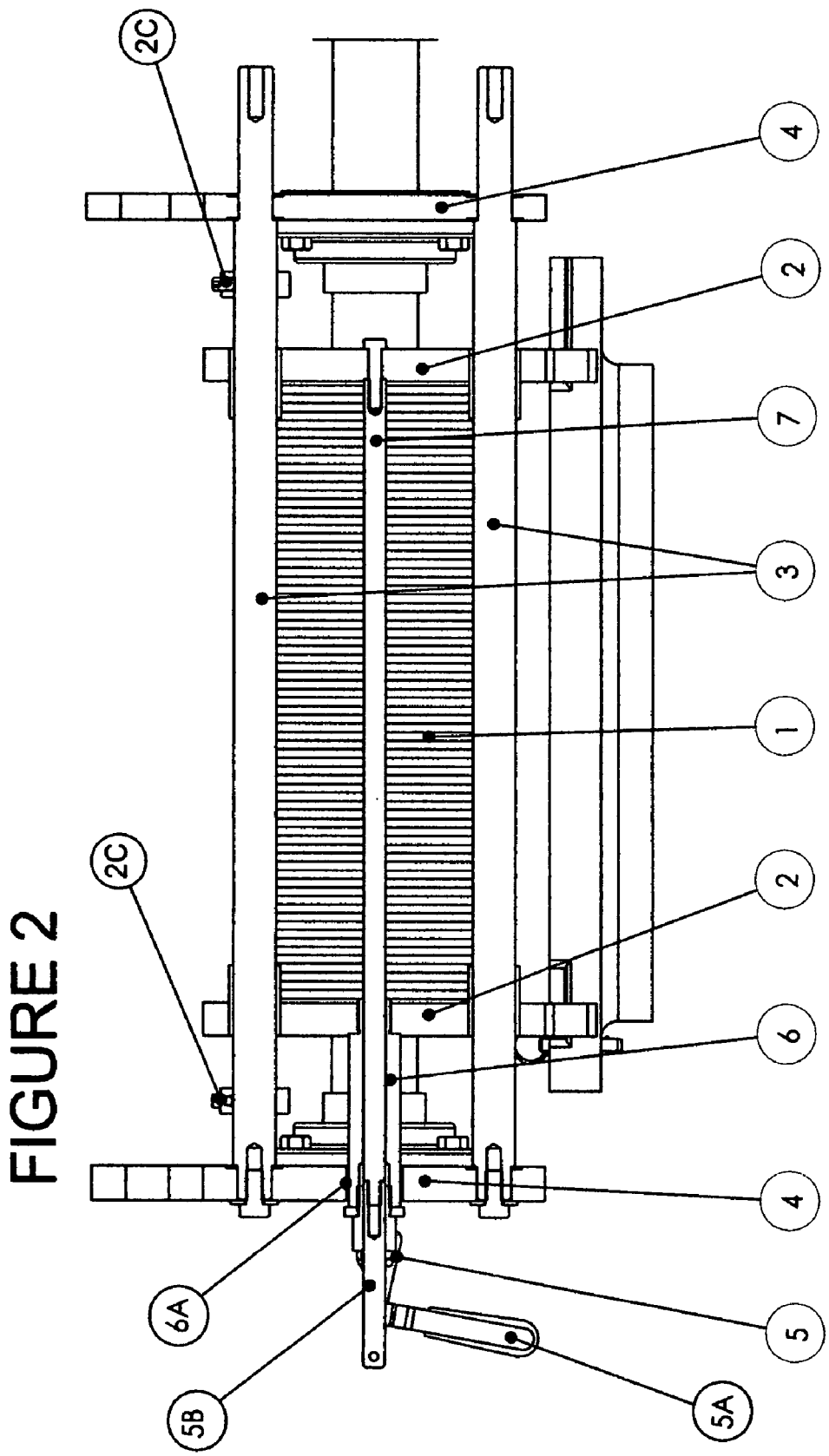
FIG. 2 shows a cross sectional view of an exemplary device of the instant invention in the operating or closed position where the roller end plates are in an operating position.
Figure 3:
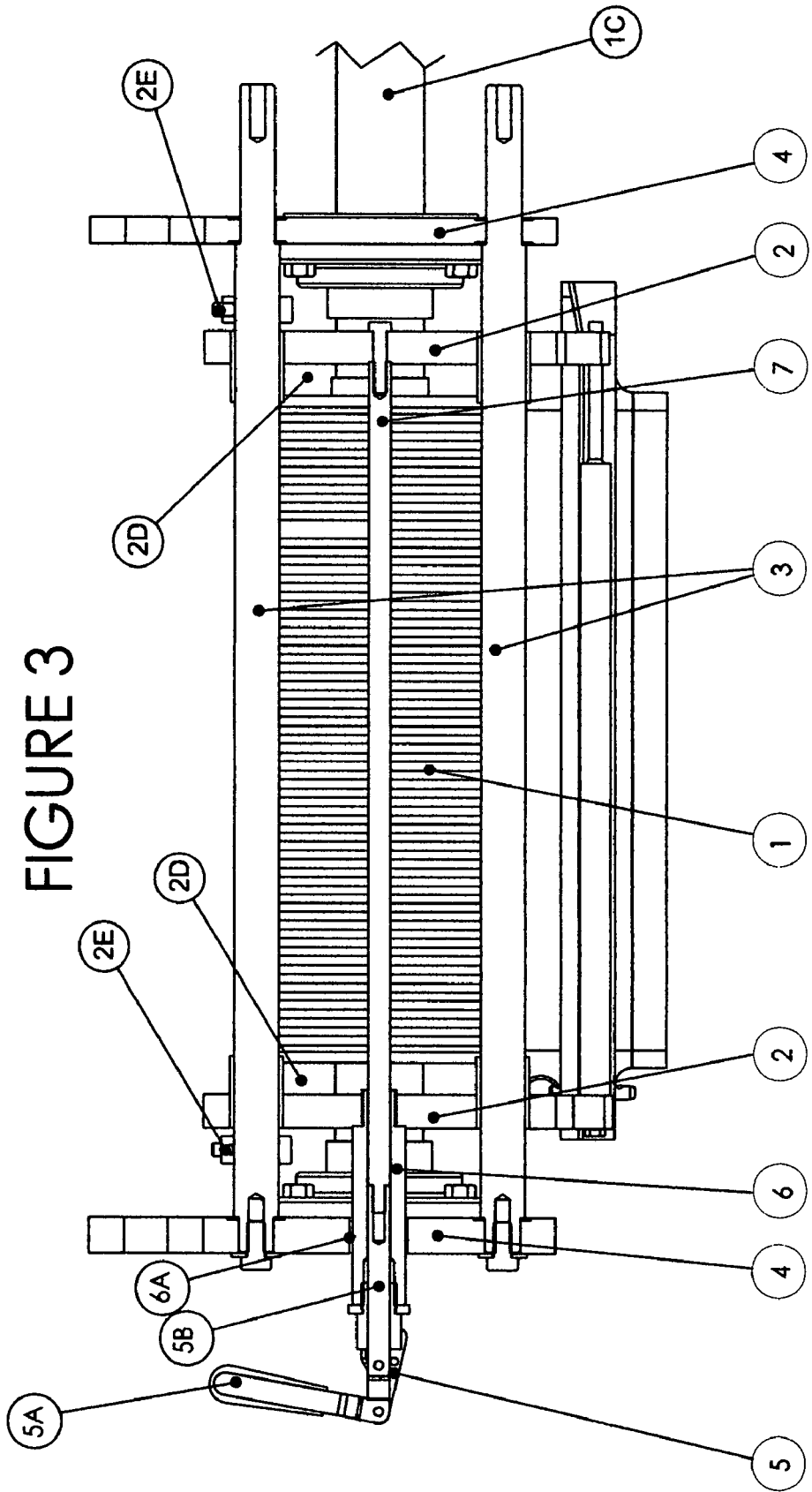
FIG. 3 shows a cross sectional view along the center line of the actuator device of an exemplary device of the instant invention where the roller ends are displaced apart from the operational position and the mating end plate counter bores.

FIGS. 2 and 3 show front cross-sectional views along the center line of the actuator device of an exemplary device of the instant invention for forming semi-solid materials in a closed and an open position, respectively. In moving from the closed, operating position of FIG. 2 to the open cleaning position of FIG. 3, the actuator device 5 is operated to open the gap 2D between the feed roller end 1A of feed roller 1 and the roller plates 2A, 2B. As seen in the FIG. 3 the actuator device 5 has actuator arms 5A that have been rotated upward to open the actuator device 5, as explained in further detail below. The movement thereby causes both of the roller end plates 2A, 2B to slide apart from each other removing the roller ends 1A of the feed rollers 1 from the counter bores 2C of the roller end plates 2A, 2B. However, variations in the operation of the actuation device are contemplated by the invention and may include mechanical, electro-mechanical or similar devices that move the plates in the manner suggested without deviating from the spirit of the invention. The movement provided by the actuator device 5 is important in that it allows for improved access to the feed rollers and operation of the seals, as explained herein below.

The opening of the roller end plates from FIG. 2 to FIG. 3 is accomplished by way of the movement of the at least one actuating device 5. The at least one actuating device or mechanism 5 is affixed to movement sleeves 6 which pass through frame plate 4 in clearance bores 6A. The movement sleeves 6 in turn are coupled to the proximal roller end plate 2A. By rotation of the actuator input or arm 5A the actuator plunger 5B moves thru the center of the actuator device 5 and pushes on actuator or central rod 7. The movement of the movement sleeve 6 which is attached to the proximal end plate 2A is not impeded by clearance bore 6B of frame plate 4 as the movement sleeve 6 is housed in a bore 6B, which has a clearance to the outer diameter of the movement sleeve 6, in frame plate 4. The movement of actuator or central rod 7, which is attached to the distal roller end plate 2B, causes distal roller end plate 2B to move away from the end of the feed roller 1. This extension movement is opposed by both of the roller end plates 2A, 2B. The end plates 2A, 2B are supported by and slide along support rods 3 as the extension force is exerted upon the end plates 2A, 2B and they in turn separated from the feed rollers ends 1A. The distal roller end plate 2B will continue to move away from the feed roller 1 until it comes in contact with the end plate stopping mechanism, here end plate stop 2E.

Once the distal end plate 2B comes in contact with end plate stop 2E further rotation of the actuator arm 5A puts pressure on the actuator device 5 through actuator plunger 5B and the attached actuator or central rod 7 through the movement sleeve 6, which is attached to the proximal end plate 2A. The continued pressure or movement of actuator arm 5A causes the proximal plate 2A to move away from the roller end 1A. This pressure on the actuator arm 5A causes the proximal end plate 2A to move away from the roller end 1A until it contacts end plate stop 2E. At this time both proximal end plate 2A and distal end plate 2B have reached the extent of there travel and movement of the actuator arm 5A is stopped.

In the opening of the device, the frame plates 4 that hold the entire assembly and supply support and rigidity for the unit when it is in operation do not move. It is important to note that the clearance bores 6a within frame plates 4 provide support for and allow unrestricted movement of the movement sleeves 6. The frame plates 4 also provide attachment for the support bars 3 upon which the end plates 2A, 2B are supported and slide, in this instance laterally, upon. The actuator device 5 and the actuator arms 5A, which are located at the outer side of the front frame plate 4, are free to move between the operational or closed and maintenance or open positions.

In this position, access is gained to the roller gap 2D. The roller gap 2D between the feed rollers ends 1A and roller end plates 2A, 2B is opened and exposed to allow for cleaning and the removal of any possible allergens of gap 2D. As seen in FIG. 3, the feed roller ends 1A have been moved out and away from the roller end plates 2A, 2B with only the main shafts 1C of the feed rollers 1 going through the centers of the roller end plates 2A, 2B.

For cleaning, the feed rollers 1 remain in place on main shafts 1C and the roller end plates 2A, 2B are slid away from the feed roller ends 1A to the maximum of their travel to where full access is available to the area between the feed roller ends 1A of the feed roller 1 and the roller end plate 2A, 2B. The gap or gap opening 2D is created, being typically 1 to 2 inches in width, at the opening between the feed rollers 1 and the feed roller end plates 2A, 2B in the open position. Once the feed roller 1 end is away from the roller end plate 2A, 2B and or the roller end plate 2A, 2B counter-bore 2C the open area being sufficient to allow for cleaning by use of a water stream for washing and or any other specified sanitation method.

In the closing of the roller end plates 2A, 2B, this is accomplished, in the exemplary embodiment shown, by reversing the rotation movement of the actuator device 5, in this case by moving the arms 5A which causes the retraction of the actuator plunger 5B of the actuator device 5 and that of actuation rod 7. The cross section of FIGS. 2 and 3 shows that the actuating or central rod 7 transmits the extension and contraction motion of the actuating device 5 to the distal roller end plate 2B in the exemplary embodiment shown. The resulting pulling of both of the roller end plates 2A, 2B towards each other and engaging the feed roller seals 8 on the roller ends 1A of the feed rollers 1. Again, variations in the type of actuating device are contemplated by the invention so that they provide the needed movement.

In this exemplary embodiment of the invention, the movement of the two roller end plates 2A, 2B being by the actuator device 5 and the movement of arms 5A, here shown as toggles or lever clamps, which also function to provide a positive lock. The arms 5A clamp so that when in the closed position the operational or pressure when running of the semi-solid materials against the roller end plates 2A, 2B causes the hold of the actuator device 5 to become tighter in the locked closed position with a force that is proportional to the pressure forces placed or exerted on the roller end plates 2A, 2B.

FIG. 4 shows a cross sectional view of an exemplary device of the instant invention for forming semi-solid materials showing the device in the closed position. This cross sectional view is along the center line of feed roller 1. It shows the feed roller ends 1A of the feed rollers 1 is contained within the counter bores 2C of the roller end plates 2A, 2B. Also shown is one of many possible methods for creating a seal 8 between the end of the feed roller end 1A and the roller end plate 2A, 2B.

A further benefit of this invention is the provision of a seal 8 to prevent semi-solid product or materials from entering into or going into the gap 2D between the roller 1 and the end plates 2A, 2B in the operating position. The prior art devices have not provided for a positive sealing element but instead provide the aforementioned unsanitary clearance space between the feed roller end of the feed roller and the roller end plate. As previously discussed, prior art machines depended on a small clearance, typically of approximately 0.010 inches that does not produce a positive seal. This often results in and in some cases the designs rely on the migration and presence of residual semi-solid product in this clearance area so as to create an effective seal between the end of the feed roll and the mating surface of the feed roll end plate. In addition to preventing potential allergens and other hygienic issues with materials retained in the gap found in prior art machines, the instant invention with seal 8 improves the scaling of the product by preventing loss of volume during operation. The gap in prior art machines diverts some material from processing by allowing it to flow into the gap area and around with rotation of the roller so that the material can exit at some point other than thru the intended discharge point.

As shown by FIG. 4, the exemplary embodiment of the instant invention allows for seal or seal arrangement 8 to be used to create a positive seal to eliminate the flow of the semi-solid material into a hard to reach clearance area, this relieves both sanitary and allergen concerns. Although there exists several methods of creating this seal arrangement, most are not usable in existing machines due to the inability of these machines to open up to allow for the servicing or access to the seal members. By utilizing the exemplary embodiment of the instant invention to open the gap 2D between the feed roller end 1A and the roller end plate 2A, 2B, it is now possible to provide a positive seal in this area that can be easily cleaned and maintained. The seal 8 creates a positive seal between the feed roller end 1A and the roller end plate 2A, 2B. The seal 8 provides a positive seal at the feed roller end 1A prevent leakage and also accumulation of the materials. The positive seal provided by seal 8 also results in a more consistent flow of semi-solid material, as the material is not diverted into a gap, resulting in greater scaling accuracy.

In FIG. 4, an example of a seal 8 can be seen. It can be seen that the feed roller seal 8 is retained in a groove 8A contained in the counter bore 2C of the roller end plate 2. It can also be understood that this seal design could be reversed from female to male, so that the seal could instead be an o-ring retained in grooves machined into the ends of the feed roller end 1A. This said grooves would be in a location where the counter-bores 2C of the roller end plates 2A, 2B overlap the grooves of the feed rollers 1. In another seal assembly contemplated by the instant invention, the ends could contain consecutive machined circumferential protrusion rings that would come directly out of the feed roller ends 1A of the feed rollers 1 and mate to opposing grooves (not shown) contained in the bottom of the counter bore 2C. The joining of these opposing grooves (not shown) in the counter bore 2C constituting a tight tolerance seal mechanism referred to as a labyrinth gland.

The result is a device that allows easy access to the rotating sealing surfaces both to allow for easy sanitizing of these surfaces and to allow for easy maintenance of the seal or sealing mechanisms. It is well understood that alternative methods of creating this seal can be implemented creating the same sealing effect which could include but are not limited to seals, rings, gaskets, sealing elements or similar components at the feed roller end 1A of the feed rollers 1, or the counter-bore 2C of the end plate 2A, 2B.

The invention is described in detail with respect to preferred or exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A method of operating and cleaning a semi-solid food product metering device comprising the steps of:
   operating the semi-solid food product metering device in an operating position to meter semi-solid food product, the semi-solid food product metering device having an actuating device, a pair of rollers having a distal and a proximal end, two roller end plates at the distal end and the proximal end of the feed rollers and making a seal therewith, an at least one support bar having the end plates supported thereon and a central rod communicating with both of the two roller end plates and the actuating device;
   halting the semi-solid food product metering device from operating;
   activating the actuating device to move the semi-solid food product metering device into an open position, wherein in moving to the open position the actuating device moves the central rod which in turn moves at least one of the two end plates laterally along the at least one support bar away from the other end plate to the open position, disengaging the seal with at least one of the end plates and opening a gap; and
   cleaning the semi-solid food product metering device, the two rollers and the gap, in the open position and activating the actuating device to return the semi-solid food product metering device to an operating position.

2. The method of operating and cleaning a semi-solid food product metering device of claim 1, wherein the activating step further comprises activating an actuating arm as part of the actuating device, the actuating arm being coupled to an actuating plunger, the actuating plunger passing through a movement sleeve, the movement sleeve passing through an at least one support plate via a bore hole such that the actuation of the actuator arm moves the actuation plunger which in turn passes through the movement sleeve and then moves the central rod which in turn moves the device from the operating position to the open position.

3. The method of operating and cleaning a semi-solid food product metering device of claim 2, wherein the activating of the actuating device step, in moving from the operating position to the open position, further comprises having the actuator arm move and in turn moving the actuation plunger, the central rod, and in turn the distal roller end plate, such that the distal roller end plate continues to move away from the feed rollers until it comes in contact with an end plate stop and once the distal roller end plate contacts the end plate stop and continued movement of the actuator arm puts pressure on the movement sleeve, which is fixed to the distal roller plate, which in turn causes the proximal end plate to move away from the proximal end of the feed rollers until it comes in contact with an additional end plate stop.

4. The method of operating a semi-solid food product metering device of claim 1, wherein the method step of operating further provides the seal via a sealing element at each of the ends of the two counter rotating feed rollers, the sealing elements being engaged in the operating position and wherein in the method step of activating the actuating device, the disengaging of the positive seal with the endplate further comprises disengaging the positive sealing elements in the open position.

* * * * *